(12) United States Patent
Priyantha et al.

(10) Patent No.: US 9,706,495 B2
(45) Date of Patent: *Jul. 11, 2017

(54) MOBILE NODE GROUP FORMATION AND MANAGEMENT

(71) Applicant: Microsoft Technology Licensing, LLC, Redmond, WA (US)

(72) Inventors: Nissanka Arachchige Bodhi Priyantha, Redmond, WA (US); Jie Liu, Medina, WA (US); Aveek Ravishekhar Purohit, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/204,869

(22) Filed: Mar. 11, 2014

(65) Prior Publication Data
US 2014/0192695 A1 Jul. 10, 2014

Related U.S. Application Data

(62) Division of application No. 13/327,449, filed on Dec. 15, 2011, now Pat. No. 8,693,453.

(51) Int. Cl.
*H04W 4/00* (2009.01)
*H04W 52/02* (2009.01)
(Continued)

(52) U.S. Cl.
CPC ....... *H04W 52/0245* (2013.01); *H04W 24/02* (2013.01); *H04W 52/0261* (2013.01); *H04W 48/08* (2013.01); *Y02B 60/50* (2013.01)

(58) Field of Classification Search
CPC combination set(s) only.
See application file for complete search history.

(56) References Cited

U.S. PATENT DOCUMENTS 6,763,014 B2 7/2004 Kennedy
7,035,240 B1 * 4/2006 Balakrishnan ........ H04W 84/18
  370/328
(Continued)

OTHER PUBLICATIONS

Karl, Holger, "An Overview of Energy-Efficiency Techniques for Mobile Communication Systems", In Proceedings of Report of the Working Group 7 "Low-power Broadband Wireless Communication" of the Arbeitsgruppe Mobikom, DLR/BMBF, TKN Technical Report TKN-03-XXX, Oct. 19, 2003, 41 pages.
(Continued)

*Primary Examiner* — Frank Duong

(57) ABSTRACT

The subject disclosure is directed towards mobile network management by reducing energy consumption and increasing a lifetime of one or more nodes. By determining a beacon listening duration and a beacon listening period in response to an energy budget, each node may minimize or reduce latencies associated with node discovery and/or node group maintenance. The beacon listening duration and the beacon listening period is used to compute a beacon broadcasting duration and a beacon broadcasting period such that advertising beacon transmissions and advertising beacon receptions occur at substantially concurrent time slots between low power states. These advertising beacons are used to propagate and maintain group membership information amongst the one or more nodes.

20 Claims, 5 Drawing Sheets

(51) Int. Cl.
*H04W 24/02* (2009.01)
*H04W 48/08* (2009.01)

(56) References Cited

U.S. PATENT DOCUMENTS

| | | | |
|---|---|---|---|
| 7,502,360 B2 | 3/2009 | Liu et al. | |
| 7,706,369 B2 | 4/2010 | Roese et al. | |
| 7,729,285 B2 | 6/2010 | Yoon | |
| 8,064,363 B2* | 11/2011 | Kohvakka et al. | 370/254 |
| 2008/0291843 A1 | 11/2008 | Sonnenberg et al. | |
| 2009/0252102 A1 | 10/2009 | Seidel et al. | |
| 2010/0110930 A1 | 5/2010 | Kohvakka et al. | |
| 2013/0128786 A1* | 5/2013 | Sultan et al. | 370/311 |

OTHER PUBLICATIONS

Dyo, et al., "A Node Discovery Service for Partially Mobile Sensor Networks", In Proceedings of 2nd International Workshop on Middleware for Sensor Networks, 2007, pp. 13-18.
Batra, et al., "Energy Efficient MAC protocols for Mobile Sensor Networks", In Proceedings of 201 O International Journal of Computer Applications (0975-8887), vol. 1, Issue No. 24, 2010, pp. 101-111.
Ververidis, et al., "A Routing Layer Based Approach for Energy Efficient Service Discovery in Mobile Ad Hoc Networks", In Proceedings of Wireless Communications and Mobile Computing, 2008, 18 pages.
Banerjee, et al., "Relays, Base Stations, and Meshes: Enhancing Mobile Networks With Infrastructure", In Proceedings of Mobicom '08, Sep. 14-19, 2008, 11 pages.
Buettner, et al., "X-Mac: A Short Preamble MAC Protocol for Duty-Cycled Wireless Sensor Networks", In Proceedings of SenSys '06, Nov. 1-3, 2006, 14 pages.
Cohen, et al., "Continuous Neighbor Discovery in Asynchronous Sensor Networks", In Proceedings of IEEE/ACM Transactions of Networking, vol. 19, No. 1, Feb. 2011, 11 pages.
Dutta, et al., "Practical Asynchronous Neighbor Discovery and Rendezvous for Mobile Sensory Applications", In Proceedings of SenSys '08, Nov. 5-7, 2008, 13 pages.
Kandhalu, et al., "U-Connect: A Low-Latency Energy-Efficient Asynchronous Neighbor Discovery Protocol", In Proceedings of IPSN '10, Apr. 12-16, 2010, 12 pages.
McGlynn, et al., "Birthday Protocols for Low Energy Deployment and Flexible Neighbor Discovery in Ad Hoc Wireless Networks", In Proceedings of 2nd ACM International Symposium on Mobile Ad Hoc Networking & Computing, 2001, 9 pages.
Polastre, et al., "Versatile Low Power Media Access for Wireless Sensor Networks", In Proceedings of SenSys '04, Nov. 3-5, 2004, 13 pages.
Syed et al., "T-Lohi: A New Class of MAC Protocols for Underwater Acoustic Sensor Networks", In Proceedings of IEEE Infocom 2008, 9 pages.
"CC2500 Low-Cost Low-Power 2.4 GHz RF Transceiver", Texas Instrument Data Sheet, Nov. 25, 2011, 96 pages.
Johnsrud, et. al., "Design Note DN505 RSSI Interpretation and Timing", Texas Instrument Data Sheet, Jun. 16, 2010, 16 pages.
"eZ430—RF2500 Development Tool", Texas Instruments, Sep. 2007, 24 pages.
Tseng, et al., Power-Saving Protocols for IEEE 802.11-Based Multi-Hop Ad Hoc Networks, In Proceedings of Infocom 2002, 2002, 10 pages.
Werner-Allen, et. al., "Firefly-Inspired Sensor Network Synchronicity with Realistic Radio Effects", In Proceedings of SenSys '05, Nov. 2-4, 2005, 12 pages.
Ye, et al., "An Energy-Efficient MAC Protocol for Wireless Sensor Networks", In Proceedings of IEEE Infocom 2002, 2002, 10 pages.
Zhang, et al., "Hardware Design Experiences in ZebraNet", In Proceedings of SenSys '04, Nov. 3-5, 2004, 12 pages.
Epson Toyocom Corporation, SG-3030 Crystal Oscillator, Epsontoyocom.co.jp, 1 page.
Perkins, et al., "RFC3561: Ad hoc On-Demand Distance Vector (AODV) Routing", Internet RFCs, Jul. 2003, 35 pages.
Purohit, et al., WiFlock: Collaborative Group Discovery and Maintenance in Mobile Sensor Networks, IEEE, Apr. 2011, 12 pages.
U.S. Appl. No. 13/327,449, "Notice of Allowance" mailed Oct. 8, 2013, 10 pages.
U.S. Appl. No. 13/327,449, "Request for Continued Examination" filed Oct. 15, 2013, 7 pages.
U.S. Appl. No. 13/327,449, "Notice of Allowance" mailed Nov. 22, 2013, 10 pages.

* cited by examiner

MOBILE NODE GROUP FORMATION AND MANAGEMENT

BACKGROUND

A mobile network facilities data communications between devices, such as mobile phones, tablets, wireless tags and/or the like, through various technologies including open networking standards or proprietary networking protocols. Example mobile networks may include sensing systems that provide measurement and/or control capabilities. The mobile network devices may be standalone or attached to moving entities. As an example, autonomous vehicles/robots may utilize the mobile network devices for wide-area surveillance and reconnaissance. Various other applications, such as scientific discovery, asset management, and smart environments, rely on the efficiency and utility of the mobile network devices, especially with respect to device mobility.

Some of these mobile networks incorporate wirelessly connected devices into target environments. As mobile devices are added or removed from such an environment, each devices desires to discover other devices (e.g., neighboring devices) and maintain group membership in response to node departures. Group discovery and maintenance are not unique to mobile networks, but employ complicated and/or time/energy consuming protocols. For example, group discovery/formation and maintenance are typically performed in two separate protocols: a neighbor discovery protocol where each device builds a neighborhood membership table and a group maintenance protocol for propagating and aggregating neighborhood membership tables into a group table.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards managing energy consumption of a mobile device/node. In one aspect, the node may not yet be a member of a group (i.e., a mobile network) and desires to first discover and connect with at least one other node within communicable vicinity. In order to improve time/energy consumption during node discovery and increase node lifetime, a group formation and management mechanism (hereinafter referred to as management mechanism) within the node reduces advertising beacon reception and transmission duty cycles.

In one aspect, the management mechanism determines a beacon listening duration and a beacon listening period in response to an energy budget. The management mechanism also determines a beacon broadcasting duration and a beacon broadcasting period based on the beacon listening period and the beacon listening duration. In one aspect, the beacon broadcasting period aligns with the beacon listening period such that the beacon broadcasting duration precedes and/or overlaps the beacon listening duration. Between low power states, the management mechanism switches to a receive state and/or a transmit state for a number of time slots corresponding to the beacon listening duration and/or the beacon broadcasting duration, respectively.

In one aspect, during the transmit state, the management mechanism may communicate an advertising beacon to the neighboring node. In another aspect, during the receive state, the management mechanism may receive an advertising beacon from a neighboring node and extract membership information. In one aspect, these nodes may form a group with other nodes by propagating the membership information during the advertising beacon transmissions and updating the membership information during the advertising beacon receptions.

In one aspect, the nodes synchronize the receive state and transmit state in order to reduce the node energy consumption. In another aspect, the nodes may evenly spread out the beacon transmissions to enable a new node to discover and join a pre-existing group.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Figure 1:
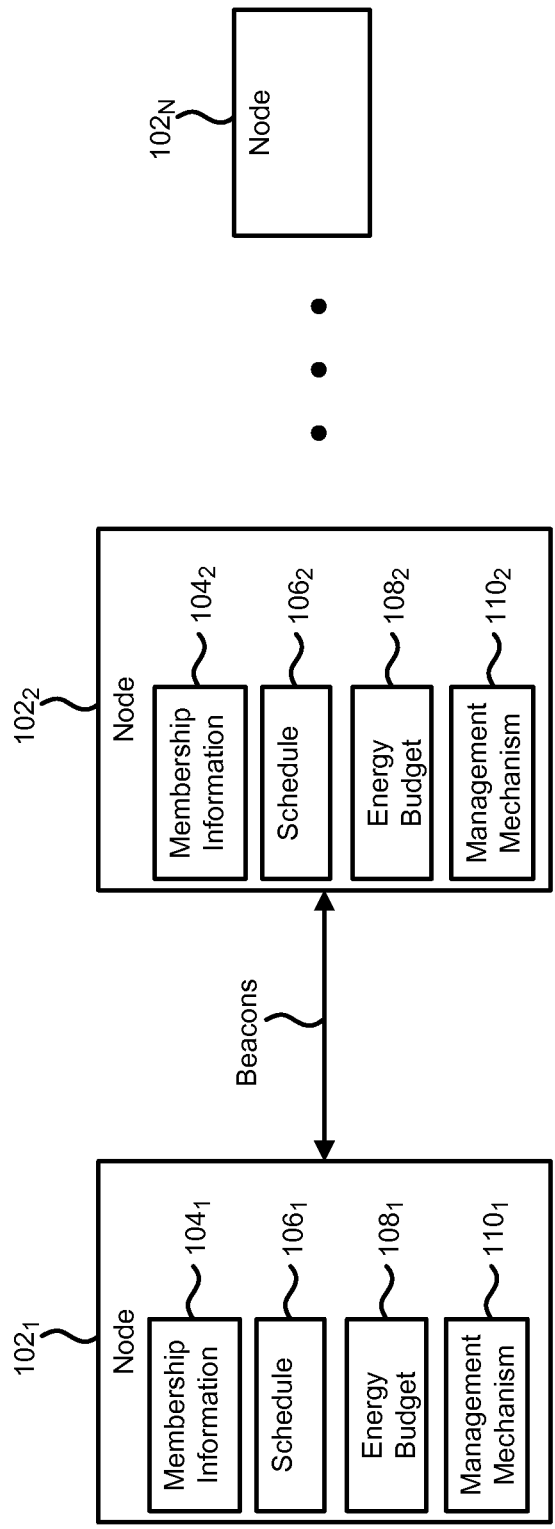
FIG. 1 is a block diagram illustrating an example system for managing a mobile network according to an example implementation.

Various aspects of the technology described herein are generally directed towards a group formation and management mechanism (hereinafter referred to as management mechanism) for reducing time/energy consumption at a node of a mobile network. The node may be attempting to discover and form a group with the other nodes within multiple-hop radio communication. In one implementation, the management mechanism may determine a beacon listening duration based on a Receive Signal Strength Indicator (RSSI) response time. In another implementation, the management mechanism may compute a beacon listening period (e.g., the time between two consecutive beacon listening durations) in response to the beacon listening duration and an energy budget (e.g., a total duty cycle allocation for the node). The management mechanism may also compute a beacon broadcasting duration and a beacon broadcasting period using the beacon listening period and the beacon listening duration (e.g., the time between two consecutive beacon broadcasting durations). In one implementation, the beacon broadcasting duration may be selected to be half of the beacon listening period. In another implementation, the beacon broadcasting period may be selected such that the duty cycle associated with advertising beacon transmissions is equal the duty cycle associated with advertising beacon receptions.

The management mechanism, according to one implementation, may switch out of a low/reduced power or power saving sate (e.g., sleep state) to perform an advertising beacon reception at one or more time slots corresponding to the beacon listening duration within the beacon listening period. After completing the advertising beacon reception or, alternatively, listening for an advertising beacon from one or more neighboring nodes, the management mechanism may switch out of the low power (sleep) state to perform an advertising beacon transmission at one or more time slots corresponding to the beacon broadcasting duration within the beacon broadcasting period. In one implementation, for two nodes within a radio communication range, the beacon broadcasting duration of one node may overlap with the beacon listening duration of the other node. After performing the advertising beacon reception and/or the advertising beacon transmission, the management mechanism switches the node back to the low power state. In one implementation, the advertising beacon may include multiple frames where each frame includes group membership information of the transmitting node.

The mobile network may be embodied within a plurality of nodes according to one implementation. Once in a group, the plurality of nodes may coordinate to synchronize the advertising beacon transmissions and the advertising beacon receptions at time slots between the low power states. The plurality of nodes may partition the beacon transmission period (i.e., the time between beacon transmissions of any given node) equally among the plurality of nodes such that transmissions from the plurality of nodes are equally spaced in time. The plurality of nodes may propagate membership information during the advertising beacon transmissions and update the membership information during the advertising beacon receptions.

In one implementation, the mobile network may be associated with a particular environment or infrastructure and may communicate with one or more computing devices that aggregate and/or analyze data acquired by the plurality of nodes. For example, a user operating a mobile phone within certain proximity of a node may download various sensed data from an extraction point. As another example, a robot with an attached mobile device (e.g., a mobile sensor) may move around the environment (e.g., a warehouse) for the purposes of collecting and/or receiving the membership information and/or logging the sensed data.

Such mobile networks may be deployed for asset tracking, smart environments, search and rescue missions and/or any other application that expect the plurality of nodes to have a long lifetime with a constrained energy budget and efficiently balance duty cycling and latency. The mobile networks that optimize or minimize energy consumption may also be applicable to environments characterized by slow mobility and/or large energy budgets where the plurality of nodes may afford to communicate frequently, such as habitats for monitoring tagged migrating animals.

Consider by way of example a typical logistics workflow. A number of items are picked from different locations to fulfill orders. They are loaded on to trucks driving to various stations, such as warehouses or hubs. At each station, some goods are unloaded and others are added to the truck. The electronic tags (e.g., active RFID tags) on the items aggregate and propagate neighborhood information so the truck-mount receivers can reliably collect all tag data onboard. In such a scenario, each tag needs a low duty cycle to save battery life since it may spend long periods without any neighbor. However, when neighbors are within a communication range, the tags need to quickly discover and propagate the information to the truck reader, so the truck can leave the station as soon as the required objects are confirmed. Thus, in mobile networks, a group discovery and maintenance protocol needs to be energy efficient, reactive (i.e. of low discovery latency), and adaptive to scales.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and mobile sensing technology in general.

FIG. 1 is a block diagram illustrating an example system for managing a mobile network according to an example implementation. A plurality of nodes $102_{1\ldots N}$ (illustrated as a node $102_1$, a node $102_2$ ... a node $102_N$ and hereinafter referred to as the nodes 102) may form the mobile network (e.g., a mobile sensor network). Initially, each of the nodes 102 may not be a member of the mobile network (i.e., in an "alone" mode). Two or more of the nodes 102 may discover each other and group together until the mobile network is created.

In one implementation, each of the nodes 102 may include various data, such as membership information 104, a schedule 106 and an energy budget 108. The membership information 104 may include a local table of values in which each entry describes another one of the nodes 102. When a membership table is received from another node, the local table may be compared to and updated with the received membership table. The schedule 106 may be used to coordinate advertising beacon receptions and advertising beacon transmissions amongst the nodes 102. For example, the schedule 106 may synchronize beacon listening durations and evenly-space and alternate beacon broadcasting durations of two or more of the nodes 102. The energy budget 108 may indicate duty cycle allocations/utilizations for the advertising beacon receptions and/or the advertising beacon transmissions.

Initially, an example node $102_1$ may not be a member of the mobile network according to one example implementation. In order to form a node group with another node, such as an example node $102_2$, a management mechanism $110_1$ of the example node $102_1$ may establish a beacon listening period and/or a beacon listening duration based on an example energy budget $102_1$. The beacon listening period may define a rate at which the example node $102_1$ switches (i.e., wakes up) from a low power state (e.g., sleep state, dormant state, idle state and/or any other power saving state) to a sensing state. In one implementation, the example energy budget $108_1$ may prescribe equal partitions of available energy (i.e., duty cycles) to beacon listening/receiving and beacon broadcasting/transmitting. Basically, the duty cycle allocations for the advertising beacon receptions and the advertising beacon transmissions may be the same.

In one example implementation, the beacon listening duration may refer to a listen time of which a radio is in receive mode for carrier sensing or packet/frame receptions, as opposed to the low power state. The beacon listening duration may define a minimum duty cycle or fraction of time/energy that the example node $102_1$ may spend listening for an advertising beacon. Such a duty cycle may be expressed as one or more time slots where the beacon listening durations occur at time slot boundaries. If, for instance, the management mechanism $110_1$ does not detect an advertising beacon from the example node $102_2$ before the beacon listening duration elapses, the example node $102_1$ switches back to a low power state. If the management mechanism $110_1$ detects the advertising beacon, the example node $102_1$ may spend one or more additional time slots (e.g., time equal to some fraction of the beacon listening duration) receiving the membership information $104_2$, connecting to the example node $102_2$ and/or forming a node group (i.e., a node neighborhood) that serves as a portion of the mobile network.

In one example implementation, the management mechanism $110_1$ also may determine an appropriate beacon broadcasting period and/or beacon broadcasting duration for the advertising beacon transmissions to other ones of the nodes 102. The example node $102_1$ may communicate an advertising beacon comprising the membership information $104_1$ to the example node $102_1$ at a rate and for a duty cycle based on the beacon listening period and/or the beacon listening duration. For instance, the management mechanism $110_1$ may establish the beacon broadcasting duration to be equal to half of the beacon listening period to ensure that the example node $102_1$ and the example node $102_2$ are able to exchange advertising beacons without collisions. As another example, the beacon broadcasting period may be computed as follows:

$$\text{beacon broadcasting period} = \frac{(\text{beacon listening period})^2}{2 \times \text{beacon listening duration}}$$

According to an alternative implementation, the beacon broadcasting duration may define a duty cycle allocation between zero and an upper bound set to the beacon listening period. Such a beacon broadcasting duration may cause collisions with between advertising beacons. If, for instance, the management mechanism $110_2$ sets the beacon broadcasting duration (in time slots) to exceed half of the beacon listening period, the example node $102_2$ may consume a significant amount of energy because a larger duty cycle is being allocated to transmitting advertising beacons. Similarly, if the management mechanism $110_2$ modifies the beacon listening period to be less than twice the beacon broadcasting duration, a larger duty cycle is being allocated to listening for incoming advertising beacons whereby more energy may be consumed. The management mechanism $110_1$ may conserve energy by reducing the rate of the advertising beacon transmissions and/or selectively turn off the advertising beacon receptions.

As the nodes 102 discover each other, the management mechanism $110_1$ may modify any of the beacon broadcasting period, the beacon broadcasting duration, the beacon listening period and/or the beacon listening duration as stored in the membership information $104_1$ at the example node $102_1$. The other nodes within the mobile network may also modify respective portions of the membership information according to a mutual protocol. If the management mechanism $110_1$ modifies the beacon broadcasting duration to be equal to the beacon listening period, when the example node $102_2$ listens to a RF channel at a start time (slot) of the beacon listening period, a node discovery may be bidirectional, which reduces an overall discovery time. Similarly, increasing a duty cycle allocation of the beacon listening period by a factor of two may decrease the overall discovery time due to the removal of some unidirectional discoveries.

In order to properly propagate the membership information 104 amongst the nodes 102, the schedule 106 may be used to regulate the advertising beacon transmissions and the advertising beacon receptions. In one implementation, the advertising beacon receptions may be coordinated by having each of the nodes 102 listen at a same beacon reception time slot. In another implementation, the advertising beacon transmissions may be coordinated by having each of the nodes 102 broadcast an advertising beacon at evenly spaced intervals. By evenly spacing and/or alternating the advertising beacon transmissions, the nodes 102 avoid collisions. Furthermore, by allocating a same duty cycle for the beacon broadcasting period and the beacon listening period, the nodes 102 may achieve a minimal amount of node discovery latency for the mobile network.

Figure 2A:
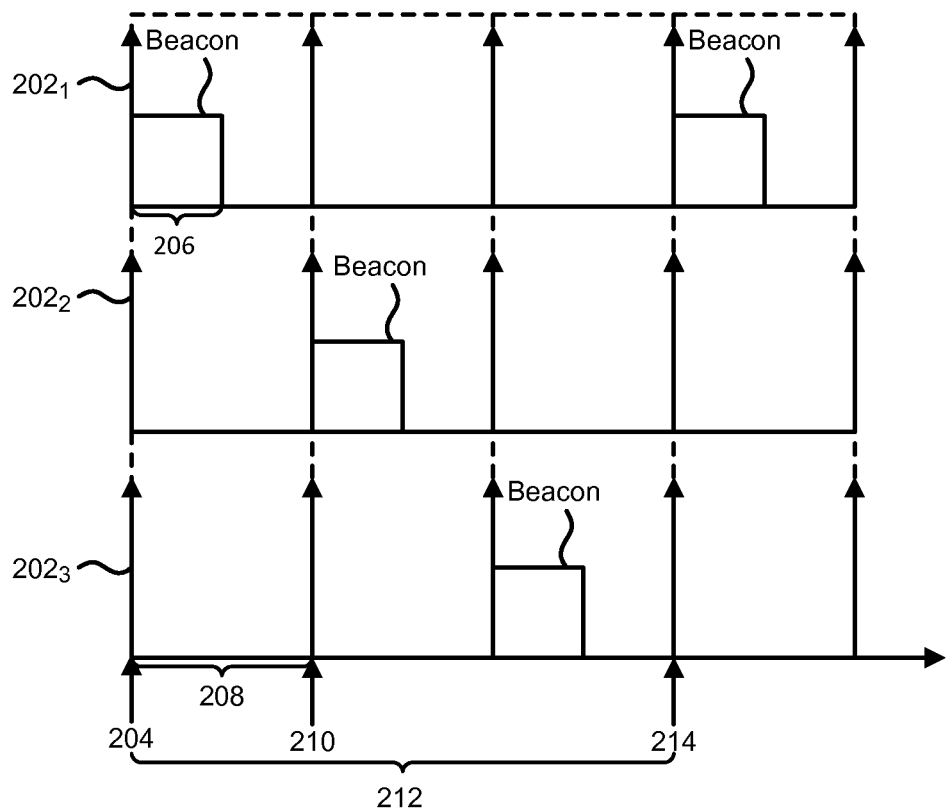
FIG. 2A illustrates coordinated beacon receptions and beacon transmissions according to an example implementation.

FIG. 2A illustrates coordinated beacon receptions and beacon transmissions according to an example implementation. Each row refers to a node of a mobile network. As illustrated, node $202_1$, node $202_2$ and node $202_3$ listen for advertising beacons at time slot 204. In one implementation, the node $202_1$ may listen for and broadcast the advertising beacons at a substantially same time. Assuming that a beacon listening duration is negligible, the node $202_1$ may also transmit a first advertising beacon at the time slot 204 (e.g., time slot number zero(0)) from which the node $202_2$ and the node $202_3$ receive and extract membership information. The first advertising beacon corresponds to a beacon broadcasting duration 206 that may be equal to half of a beacon listening period 208.

The time slot 204 may be referred to herein as a (scheduled) beacon transmission time slot associated with the node $202_1$. Alternatively, the node $202_1$ may transmit the first advertising beacon at any time slot within the beacon broadcasting period. If the node $202_1$ is busy with an advertising beacon reception, the node $202_1$ may perform the advertising beacon transmission at a next time slot after the time slot 204. As another alternative example, the node $202_1$ may transmit the first advertising beacon at a time slot that corresponds to a midpoint of the beacon listening period.

In one implementation, at each time interval equal to the beacon listening period 208, the node $202_1$, the node $202_2$ and the node $202_3$ listen for the advertising beacons and alternate beacon transmissions. As illustrated in FIG. 2A, beacon broadcasting periods associated with the node $202_2$ and the node $202_3$ are generally equal in size, but commence at different start time (slots) spaced a full beacon listening period 208 apart. For example, the node $202_2$ may be scheduled to broadcast a second advertising beacon at time slot 210. Furthermore, the node $202_1$, the node $202_2$ and the node $202_3$ do not transmit another advertising beacon until a time interval encompassing a corresponding beacon broadcasting period ends/repeats. For instance, when a beacon broadcasting period 212 for the node $202_1$ restarts at a time slot 214, the node $202_1$ may broadcast an updated advertising beacon as depicted in FIG. 2A.

At the time slot 210, the node $202_2$ switches out (i.e., wakes up) of a low power state and into a receive state/mode where the node $202_2$ listens for the advertising beacons according to one implementation. After the beacon listening duration elapses, the node $202_2$ switches into a transmit state/mode and communicates the second advertising beacon, which is received by the node $202_1$ and the node $202_3$. The transmit state and the receive state may occur concurrently or near-concurrently within the time slot 210. When the advertising beacon transmission completes, the node $202_2$ may switch out of the transmit state/mode and into the low power state until a next beacon reception time slot and/or a next beacon transmission time slot. In one implementation, the node $202_1$ and the node $202_3$ may also switch out of a low power state (i.e., an idle mode) and into a receive state/mode at which the node $202_1$ and the node $202_3$ may sense the advertising beacon at the time slot 210 and utilize a remaining portion of the time slot 210 for receiving a complete copy of membership information. After the time slot 210, the node $202_1$ and the node $202_3$ switch back into the low power state.

Figure 2B:
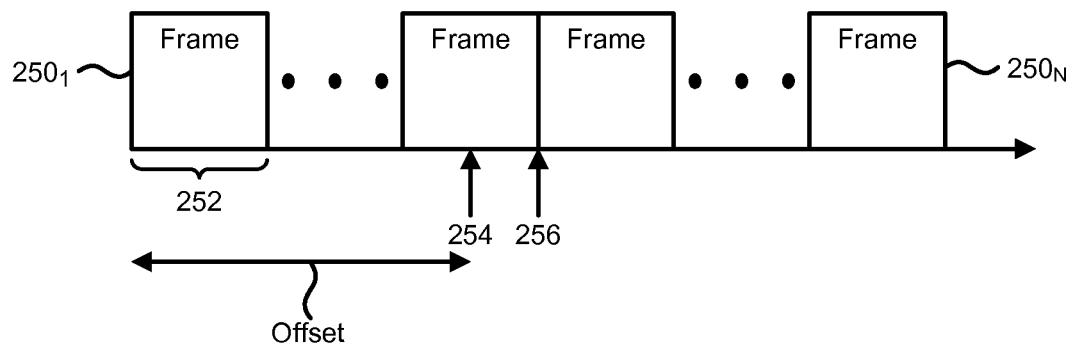
FIG. 2B illustrates an advertising beacon that is transmitted by a node and received by another node according to an example implementation.

FIG. 2B illustrates an advertising beacon that is transmitted by a node and received by another node according to an example implementation. The advertising beacon may include a plurality of frames 250 comprising self-contained packets. Each frame 252 of the plurality of frames 250 may store a copy of the membership information. Each frame 252 may be assigned a frame number referring to a position in the plurality of frames 250. If a node starts listening at time 254, which is after a frame start time, the node may decode a next frame starting at time 256. Using a time difference between the time 254 and the time 256 and a frame number, the node may compute an offset (e.g., in milliseconds) between an advertising beacon start time (i.e., the time slot 204 of FIG. 2A) and the time 254. Because the advertising beacon transmission starts at or after a beacon listening period, the offset is substantially equal to the offset between the beacon listening periods of two nodes.

Figure 3:
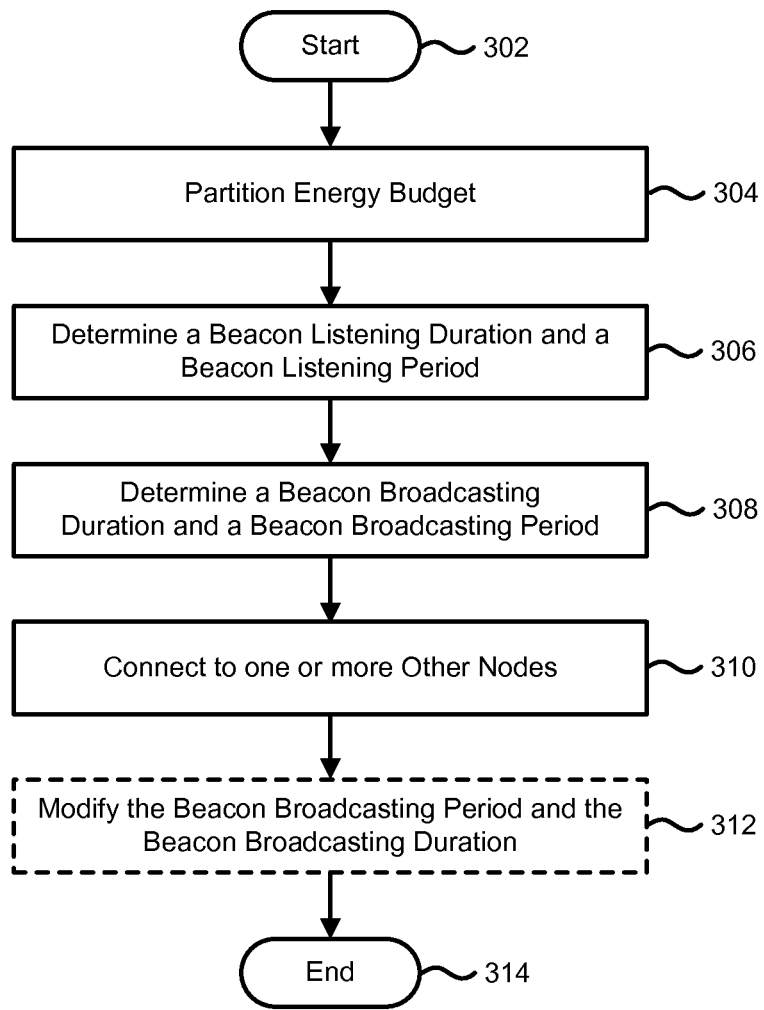
FIG. 3 is a flow diagram illustrating example steps for managing energy consumption of a node according to an example implementation.

FIG. 3 is a flow diagram illustrating example steps for managing energy consumption of a node according to an example implementation. Steps depicted in FIG. 3 may be performed by the management mechanism 110. These steps commence at step 302 and proceed to step 304 where an energy budget is partitioned by the node. In one implementation, the energy budget indicates an upper bound for a total duty cycle allocation in a node, which represents a measure of a fraction (e.g., 0.5%) of time/energy for advertising beacon transmissions and/or advertising beacon receptions. The management mechanism 110 may assign each with equal portions of such a fraction. As a result, the node spends an equal amount of time/energy listening for, and occasionally receiving, advertising beacons as broadcasting.

Step 306 represents a determination of a beacon listening duration. In one implementation, the beacon listening duration may refer to a radio listen time during which the node detects a presence of a busy Radio Frequency (RF) carrier by measuring the Receive Signal Strength Indicator (RSSI) value and comparing such a value with a threshold. Performing a valid carrier sense depends on an amount of time utilized by the radio to provide a valid value for RSSI (i.e. the RSSI response time), which further depends on a number of configurable parameters of the radio, such as receiver filter bandwidth, data rate, modulation format, AGC (Analog Gain Control) module parameters and/or the like. Hence, the RSSI value or response time may represent a lower bound or minimum for the beacon listening duration. As an alternative mechanism for providing the RSSI value, a dedicated carrier sensing module that is optimized for faster carrier detection than the AGC module may reduce the beacon listening duration and the total duty cycle allocation.

In one implementation, a beacon listening period may be determined by dividing the beacon listening duration by the assigned portion of the total duty cycle allocation. The beacon listening period may refer to a frequency or rate at which the radio is in receive mode for either carrier sensing or packet receptions, as opposed to the low power state/mode. As described herein, the beacon listening period may influence a size of the advertising beacon.

Step 308 is directed to determining a beacon broadcasting duration and a beacon broadcasting period. In one implementation, the beacon broadcasting duration may be computed to be half of the beacon listening period. Hence, the beacon broadcasting period may be computed to be the beacon listening period divided by the assigned portion of the total duty cycle allocation. If the node consumes half of the total energy for the advertising beacon transmissions and the other half for the advertising beacon receptions, the total duty cycle allocation are equal for both. For example, if the beacon listening duration is eighty (80) microseconds and the total duty allocation is two-tenths of a percent (0.2%), the management mechanism 110 may establish the beacon listening period to be forty (40) milliseconds, the beacon broadcasting duration to be twenty (20) milliseconds and the beacon broadcasting period to be ten (10) seconds.

Step 310 is directed to connecting to one or more other nodes. As described herein, through exchanges of advertising beacons, nodes may group together and form a mobile network. In one implementation, the nodes may share a schedule for coordinating the advertising beacon transmissions and the advertising beacon receptions to avoid collisions and/or to satisfy the energy constraints computed at step 306 and step 308. Optional step 312 refers to modifying the beacon broadcasting period and/or the beacon broadcasting duration if the energy budget is changed. Step 314 terminates the examples steps depicted in FIG. 3.

Figure 4:
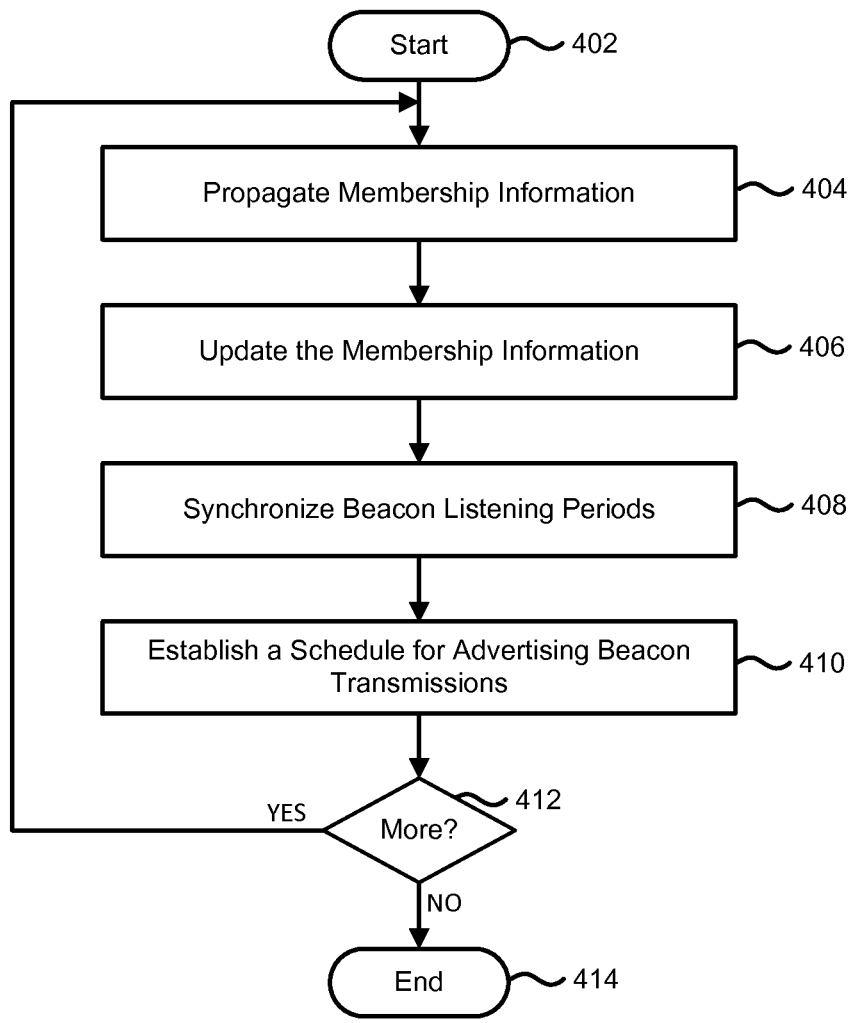
FIG. 4 is a flow diagram illustrating example steps for coordinating advertising beacon transmissions and advertising beacon receptions between low power states according to an example implementation.

FIG. 4 is a flow diagram illustrating example steps for coordinating advertising beacon transmissions and advertising beacon receptions between low power states according to an example implementation. Steps depicted in FIG. 4 may be performed by a plurality of nodes forming a mobile network. These steps commence at step 402 and proceed to step 404 at which membership information corresponding to the mobile network is propagated. As the membership information is propagated using advertising beacons, each node merges received membership information from node neighbors and updates local membership information with the merged received membership information. Each node may also sort the resulting membership information to maintain a smallest node identifier at a beginning of a frame for time slot synchronization.

Step 406 is directed to updating the membership information. In one example implementation, the membership information that is locally stored at each node may be updated to reflect changes in the mobile network, such as a current time slot counter increment/decrement, a node addition, a node departure and/or the like. For example, when an example node receives an advertising beacon from a new node seeking to join the plurality of nodes, a management mechanism within the example node may create an entry in the local membership information and add a node identifier (e.g., a highest node identifier within the plurality of nodes or any other available node identifier). Furthermore, the new node stores the membership information received from the example node.

The management mechanism transmits the updated (local) membership information during a next beacon broadcasting period, which may cause any neighboring node to update corresponding local membership information to reflect the addition of the new node. Each neighboring node may further propagate the updated membership information at a next beacon transmission time slot at which nodes that may be two or more hops away from the example node may receive the entry associated with the new node. If the new node previously formed a portion of another node group, the management mechanism may combine the other node group with the plurality of nodes by creating one or more corresponding entries in the membership information and, in a similar fashion to the new node, propagating these entries to each node within the plurality of nodes.

According to one example implementation involving node departures, the membership information may include time-to-live (TTL) data (e.g., numerical values) associated with each node of the plurality of nodes. When transmitting the advertising beacon, each node initializes the time-to-live data, which may be based on requirements directed to how quickly the node departure should be detected, a maximum number of expected hops in the plurality of nodes and/or the like. Whenever a particular node receives an advertising beacon comprising the updated membership information from a neighboring node, the management mechanism decrements received TTL values for each node. Since the TTL value of a node is decremented at each hop, the initial TTL value indicates how many hops a given node identifier is propagated within the plurality of nodes.

The management mechanism may also compare these TTL values with the TTL data stored in the local membership information. If the advertising beacon includes a certain node identifier that is not contained within the local membership information, such an identifier may be added, along with an associated TTL value, as a new entry; otherwise, a local TTL value for the certain node identifier is decremented. Alternatively, if the associated TTL value exceeds the local TTL value, the local membership information is updated to reflect the associated TTL value, which is subsequently decremented (e.g., by one (1)) along with every other local TTL value. The management mechanism may remove any entry indicating a TTL value equal to zero (0) from the membership information.

Step 408 is directed to synchronizing beacon listening periods. In one example implementation, similar or equivalent management mechanisms within the plurality of nodes establish a specific time at which all of the nodes switch to a receive mode for advertising beacons. In one alternate implementation, the plurality of nodes may listen for the advertising beacon during a range of time slots. Because the beacon listening durations may be arbitrarily short, there may be offsets between listen times of two or more nodes. To accommodate these nodes, the advertising beacon may comprise a sequence of frames in which each frame is a self-contained packet that includes a copy of the membership information.

The plurality of nodes may utilize the offsets in a sequence of frames to achieve mobile network-wide beacon listening period synchronization and adjust the beacon reception time slots. In one implementation, the management mechanism determines an offset between a time at which the example node began listening to a frame and a start time of a next frame. The management mechanism may begin examining data starting at the next frame and advance the beacon reception time slot by the offset at a next advertising beacon reception. The management mechanism may also determine an offset between a beacon start time and the time at which the example node began listening, which represents a difference between beacon reception time slots of the example node and the transmitting neighbor node. Because advertising beacon transmissions may occur immediately after or during advertising beacon receptions, if the example node has membership information associated with a node member that the transmitting neighbor node does not have, the transmitting neighbor node may wish to adjust an associated beacon reception time slot in order to receive advertising beacons from the example node.

In one example implementation, the example node may synchronize one or more beacon reception time slots towards a smallest node identifier associated with one or more received advertising beacons. Since the membership information may be a table comprising entries that are sorted by node identifier, the smallest node identifier may correspond to a first entry amongst the one or more received advertising beacons. In one implementation, if the example node processes an advertising beacon having a first entry associated with a higher node identifier, the example node may temporarily extend a next advertising beacon transmission to a length equal to a full beacon listening period to propagate the synchronization information from the node with smaller identifier to the node with the larger identifier. The transmitting neighbor node may synchronize to the example node, and therefore the plurality of nodes iteratively synchronize to the node with the smallest node identifier.

Step 410 represents establishing a schedule for beacon transmissions. In one implementation, the schedule may define evenly spaced advertising beacon transmissions, which minimizes a number of collisions and enables mobile network size scaling.

A node associated with a smallest node identifier may select an arbitrary time slot as slot number zero (0). Each of the plurality of nodes maintains a current slot counter in the membership information, which may be computed using one or more received advertising beacons. Each received advertising beacon may indicate a slot number of a corresponding beacon transmission time slot. The each node updates the current slot counter if an advertising beacon is received from a node with a node identifier that is equal to or less than a smallest node identifier observed thus far.

In one implementation, there may be a number of beacon slots in each beacon broadcasting period that may be computed as follows:

$$\frac{2 \times \text{beacon broadcasting period}}{\text{beacon listening period}}$$

In such an implementation, each node uses an associated position i within sorted membership information $I_i$ and a size s to compute the corresponding beacon transmission time slot $S_T(i)$ as follows:

$$S_{T(i)} = \frac{p \times l_i}{2 \times s}$$

The example node may transmit an advertising beacon when the current (local) slot counter reaches the computed beacon transmission time slot. To further overcome any potential collisions overcome, the plurality of nodes may insert jitters into the schedule according to one implementation. Each node may select a beacon transmission time slot or, alternatively, be assigned a random time slot that is uniformly distributed about a range of potential time slots centered around the computed beacon transmission time slot. Such a range may depend upon a size of the plurality of node and/or the length of the beacon broadcasting period.

Step 404 to step 410 of FIG. 4 depict a discovery and maintenance protocol that is embodied within a same advertising beacon reception or a same advertising beacon transmission. Performing node discovery and maintenance together achieves improved energy efficiency, reaction times and scalability. Since a node can spend a significant amount of time without any neighbors, optimizing broadcasting and listening periods and durations is critical to reducing overall energy consumption by achieving low duty cycles (e.g., approximately 0.2%) without sacrificing discovery latency.

In another implementation, the discovery and maintenance protocol may accommodate the plurality of nodes having a large group size by splitting the membership information (e.g., table) across multiple frames and multiple advertising beacons. Since correct synchronization of the listening periods and coordination of the broadcasting periods only depend on a smallest node identifier that a particular node has received thus far, it is not necessary to repeat the smallest node ID across multiple frames and multiple advertising beacons. To prevent a premature timeout, a larger initial time-to-live value may need to be used.

Step 412 determines whether there are more advertising beacons to be transmitted. If the mobile network is still connected, step 412 returns to step 404. If no more advertising beacons are to be transmitted, step 412 proceeds to step 414. Step 414 terminates the steps depicted in FIG. 4.

Figure 5:
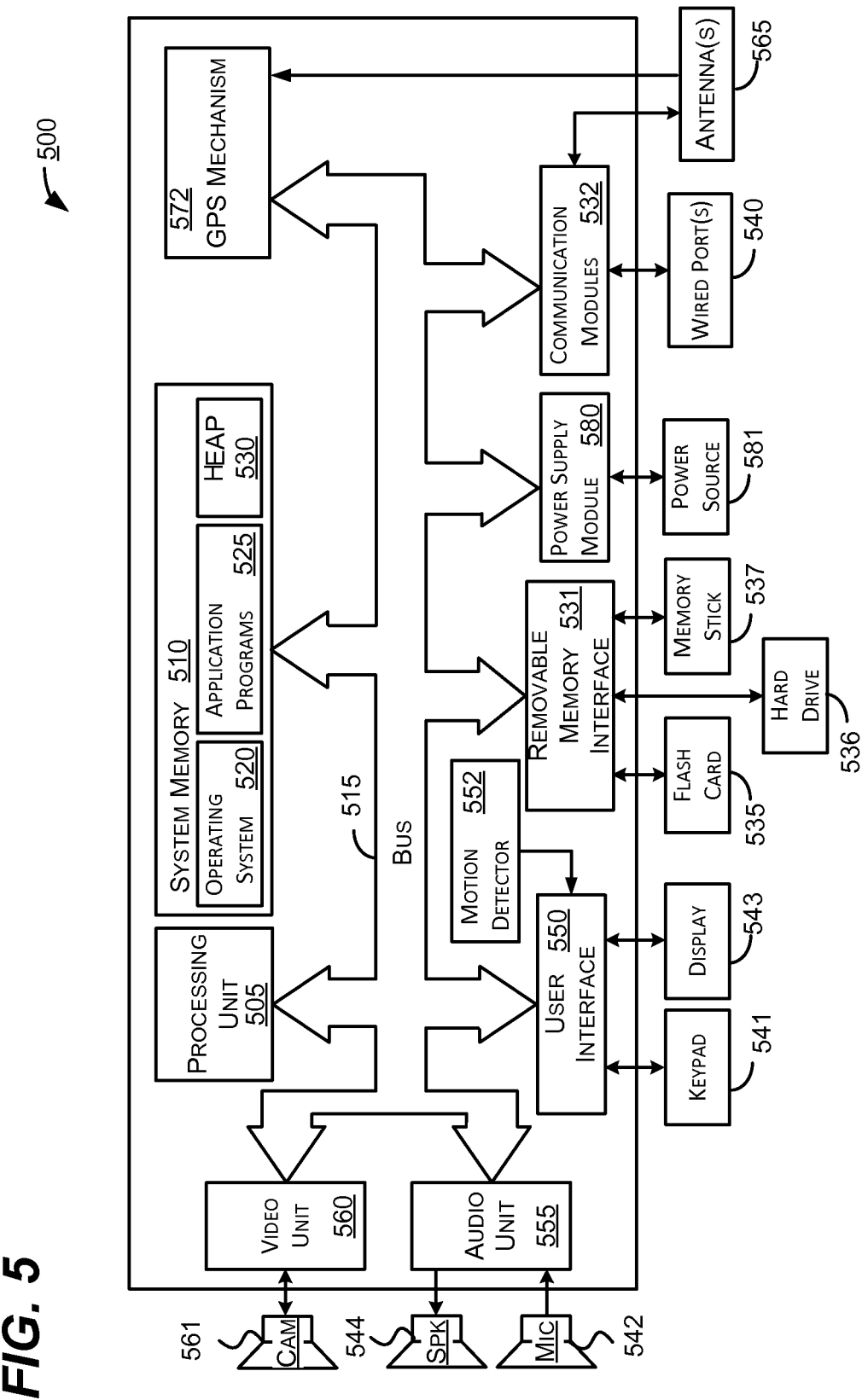
FIG. 5 illustrates an example of a suitable mobile device on which aspects of the subject matter described herein may be implemented.

FIG. 5 illustrates an example of a suitable mobile device 500 on which aspects of the subject matter described herein may be implemented. The mobile device 500 is only one example of a device and is not intended to suggest any limitation as to the scope of use or functionality of aspects of the subject matter described herein. Neither should the mobile device 500 be interpreted as having any dependency or requirement relating to any one or combination of components illustrated in the example mobile device 500.

With reference to FIG. 5, an example device for implementing aspects of the subject matter described herein includes a mobile device 500. In some embodiments, the mobile device 500 comprises an active RFID tag, a mobile device, such as a cell phone or any other handheld device that allows voice and/or other communications with others, some other voice communications device, or the like. In these embodiments, the mobile device 500 may be equipped with a camera for taking pictures, although this may not be required in other embodiments. In other embodiments, the mobile device 500 may comprise a personal digital assistant (PDA), hand-held gaming device, notebook computer, printer, appliance including a set-top, media center, or other appliance, other mobile devices, or the like. In yet other embodiments, the mobile device 500 may comprise devices that are generally considered non-mobile such as personal computers, servers, or the like.

Components of the mobile device 500 may include, but are not limited to, a processing unit 505, system memory 510, and a bus 515 that couples various system components including the system memory 510 to the processing unit 505. The bus 515 may include any of several types of bus structures including a memory bus, memory controller, a peripheral bus, and a local bus using any of a variety of bus architectures, and the like. The bus 515 allows data to be transmitted between various components of the mobile device 500.

The mobile device 500 may include a variety of computer-readable media. Computer-readable media can be any available media that can be accessed by the mobile device 500 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the mobile device 500.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, Bluetooth®, Wireless USB, infrared, WiFi, WiMAX, and other wireless media. Combinations of any of the above should also be included within the scope of computer-readable media.

The system memory 510 includes computer storage media in the form of volatile and/or nonvolatile memory and may include read only memory (ROM) and random access memory (RAM). On a mobile device such as a cell phone, operating system 520 is sometimes included in ROM although, in other embodiments, this is not required. Similarly, application programs 525 are often placed in RAM although again, in other embodiments, application programs may be placed in ROM or in other computer-readable memory. The heap 530 provides memory for state associated with the operating system 520 and the application programs 525. For example, the operating system 520 and application programs 525 may store variables and data structures in the heap 530 during their operations.

The mobile device 500 may also include other removable/non-removable, volatile/nonvolatile memory. By way of example, FIG. 5 illustrates a flash card 535, a hard disk drive 536, and a memory stick 537. The hard disk drive 536 may be miniaturized to fit in a memory slot, for example. The mobile device 500 may interface with these types of non-volatile removable memory via a removable memory interface 531, or may be connected via a universal serial bus (USB), IEEE bus, one or more of the wired port(s) 540, or antenna(s) 565. In these embodiments, the removable memory devices 535-537 may interface with the mobile device via the communication module(s) 532. In some embodiments, not all of these types of memory may be included on a single mobile device. In other embodiments, one or more of these and other types of removable memory may be included on a single mobile device.

In some embodiments, the hard disk drive 536 may be connected in such a way as to be more permanently attached to the mobile device 500. For example, the hard disk drive 536 may be connected to an interface such as parallel advanced technology attachment (PATA), serial advanced technology attachment (SATA) or otherwise, which may be connected to the bus 515. In such embodiments, removing the hard drive may involve removing a cover of the mobile device 500 and removing screws or other fasteners that connect the hard drive 536 to support structures within the mobile device 500.

The removable memory devices 535-537 and their associated computer storage media, discussed above and illustrated in FIG. 5, provide storage of computer-readable instructions, program modules, data structures, and other data for the mobile device 500. For example, the removable memory device or devices 535-537 may store images taken by the mobile device 500, voice recordings, contact information, programs, data for the programs and so forth.

A user may enter commands and information into the mobile device 500 through input devices such as a key pad 541 and the microphone 542. In some embodiments, the display 543 may be touch-sensitive screen and may allow a user to enter commands and information thereon. The key pad 541 and display 543 may be connected to the processing unit 505 through a user input interface 550 that is coupled to the bus 515, but may also be connected by other interface and bus structures, such as the communication module(s) 532 and wired port(s) 540. Motion detection 552 can be used to determine gestures made with the device 500.

A user may communicate with other users via speaking into the microphone 542 and via text messages that are entered on the key pad 541 or a touch sensitive display 543, for example. The audio unit 555 may provide electrical signals to drive the speaker 544 as well as receive and digitize audio signals received from the microphone 542.

The mobile device 500 may include a video unit 560 that provides signals to drive a camera 561. The video unit 560 may also receive images obtained by the camera 561 and provide these images to the processing unit 505 and/or memory included on the mobile device 500. The images obtained by the camera 561 may comprise video, one or more images that do not form a video, or some combination thereof.

The communication module(s) 532 may provide signals to and receive signals from one or more antenna(s) 565. One of the antenna(s) 565 may transmit and receive messages for a cell phone network. Another antenna may transmit and receive Bluetooth® messages. Yet another antenna (or a shared antenna) may transmit and receive network messages via a wireless Ethernet network standard.

Still further, an antenna provides location-based information, e.g., GPS signals to a GPS interface and mechanism 572. In turn, the GPS mechanism 572 makes available the corresponding GPS data (e.g., time and coordinates) for processing.

In some embodiments, a single antenna may be used to transmit and/or receive messages for more than one type of network. For example, a single antenna may transmit and receive voice and packet messages.

A power supply module 580 may interface with a power source 581, such as a battery or an alternative power source. The battery may include one or more electrochemical cells that store electricity. Via a connector, the power supply module 580 provides power in the form of electric current to various circuitries within the mobile device 500.

When operated in a networked environment, the mobile device 500 may connect to one or more remote devices. The remote devices may include a personal computer, a server, a router, a network PC, a cell phone, a media playback device, a peer device or other common network node, and typically includes many or all of the elements described above relative to the mobile device 500.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, active RFID tags, sensor nodes, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Furthermore, although the term server may be used herein, it will be recognized that this term may also encompass a client, a set of one or more processes distributed on one or more computers, one or more stand-alone storage devices, a set of one or more other devices, a combination of one or more of the above, and the like.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. In a computing environment, a system comprising:
   a node associated with a mobile network configured to:
      establish a beacon listening duration of the node;
      establish a beacon listening period of the node, the beacon listening period being a period between two consecutive listening durations;
      extend the beacon listening duration of the node on detecting a presence of an advertising node, the advertising node switching out of a low power state to a broadcasting state; and
      coordinate beacon transmissions and beacon receptions with other nodes in the mobile network at time slots between low power states, the low power states being power saving states during which the beacon transmissions and the beacon receptions are disabled.

2. The system of claim 1, wherein the node is further configured to receive membership information of the advertising node during the extended beacon listening duration.

3. The system of claim 2, wherein the node is further configured to connect to the advertising node based on the received membership information.

4. The system of claim 2, wherein the node further comprises: a management mechanism configured to add a node identifier associated with the advertising node to the membership information.

5. The system of claim 4, wherein the node further comprises: a management mechanism configured to remove the node identifier associated with the advertising node from the membership information upon the advertising node moving out of a radio communication range.

6. The system of claim 1, wherein the node is further configured to establish a beacon broadcasting duration and a beacon broadcasting period.

7. The system of claim 1, wherein the node is further configured to synchronize the beacon listening period and to alternate beacon transmission time slots.

8. In a computing environment, a system comprising:
a management mechanism implemented on a node and configured to:
determine a beacon listening duration and a beacon listening period in response to an energy budget;
determine a beacon broadcasting duration based on the determined beacon listening period and the beacon listening duration;
increase the determined beacon listening duration based on detection of a presence of one or more other nodes during the determined beacon listening duration; and
obtain membership information of the one or more other nodes.

9. The system of claim 8, wherein the management mechanism is further configured to connect the node to the one or more other nodes at one or more time slots corresponding to at least one of the determined beacon listening duration and the determined beacon broadcasting duration.

10. The system of claim 8, wherein the management mechanism is further configured to propagate membership information during the determined beacon broadcasting duration using a beacon transmission.

11. The system of claim 8, wherein the management mechanism is further configured to update membership information during beacon receptions.

12. The system of claim 8, wherein the management mechanism is further configured to establish a schedule for at least one of beacon transmissions and advertising beacon receptions.

13. The system of claim 8, wherein the management mechanism is further configured to determine a beacon transmission time slot based on the determined beacon listening period and a node identifier.

14. The system of claim 8, wherein the management mechanism is further configured to partition a total duty cycle allocation into substantially equal shares for the determined beacon listening duration and the determined beacon broadcasting duration.

15. The system of claim 8, wherein the management mechanism is further configured to selectively turn off one or more beacon receptions.

16. In a computing environment, a method for establishing a network of nodes over wireless links, the method being performed by a processor, the method comprising:
coordinating beacon transmissions and beacon receptions of the nodes at time slots between low power states of the nodes, the coordination establishing the network of nodes;
propagating membership information, associated with the nodes forming the network, between the nodes during the beacon transmissions; and
updating the membership information, associated with the nodes forming the network, between the nodes during the beacon receptions.

17. The method of claim 16, further comprising:
transmitting a beacon transmission based on a start time of a beacon listening period.

18. The method of claim 16, further comprising:
transmitting a beacon transmission based on an intermediate time of a beacon listening period.

19. The method of claim 16, further comprising:
determining a beacon listening duration based on a Receive Signal Strength Indicator (RSSI) response time;
computing a beacon listening period based on the beacon listening duration and an energy budget; and
switching into a receive state at one or more time slots corresponding to the beacon listening duration within the beacon listening period.

20. The method of claim 16, further comprising:
computing a beacon broadcasting period using a beacon listening period and a beacon listening duration;
computing a beacon broadcasting duration to be a portion of the beacon listening duration; and
switching from a receive state into a transmit state at one or more time slots corresponding to the beacon broadcasting duration within the beacon broadcasting period.

* * * * *